United States Patent

Milcz et al.

[11] 4,035,581
[45] July 12, 1977

[54] CODE WORD DETECTING METHOD

[75] Inventors: Wilhelm Milcz, Weissach im Tal; Wolfgang Steinert, Backnang, both of Germany; Bo Ekström, Stockholm, Sweden

[73] Assignee: Licentia Patent-Verwaltungs-G.m.b.H., Frankfurt am Main, Germany

[21] Appl. No.: 674,944

[22] Filed: Apr. 8, 1976

[30] Foreign Application Priority Data

Apr. 8, 1975    Germany .................... 2515298

[51] Int. Cl.² .................................. H04L 27/22
[52] U.S. Cl. ............................ 178/67; 178/88; 325/320
[58] Field of Search ............ 178/67, 88; 325/30, 325/43, 44, 320, 323, 324; 329/104

[56] References Cited

U.S. PATENT DOCUMENTS

| | | | |
|---|---|---|---|
| 3,341,776 | 9/1967 | Doelz et al. | 325/30 |
| 3,654,564 | 4/1972 | Tisi et al. | 325/320 |
| 3,660,764 | 5/1972 | Goell | 325/320 |
| 3,736,507 | 5/1973 | Wolejsza et al. | 325/30 |
| 3,758,870 | 9/1973 | Schmitt et al. | 325/320 |
| 3,806,815 | 4/1974 | Fletcher | 325/320 |
| 3,838,415 | 9/1974 | Melvin | 325/320 |
| 3,993,956 | 11/1976 | Gilmore et al. | 325/324 |

*Primary Examiner* — Robert L. Griffin
*Assistant Examiner* — Marc E. Bookbinder
*Attorney, Agent, or Firm* — Spencer & Kaye

[57] ABSTRACT

A method for detecting a predetermined code word contained in received signals in a transmission system which operates with a four-phase type of modulation at the transmitter and coherent demodulation at the receiver, the code word being transmitted only as signals in two phases which are 180° apart and the received signals being divided into orthogonal voltage components during demodulation, which method includes selecting that one of the sum and difference of the voltage components which has the larger absolute magnitude value, and evaluating the received signal in accordance with the algebraic sign of that one of the sum and difference which is thus selected.

18 Claims, 10 Drawing Figures

CODE WORD DETECTING METHOD

BACKGROUND OF THE INVENTION

The present invention relates to data transmission procedures, and particularly procedures involving four-phase modulation of digital signals.

In data transmission systems it is usually necessary to transmit, in addition to the useful information, certain code words of fixed content and agreed-upon meaning, for example, to defined those certain points in time which identify the beginning of a long sequence of signals or an address.

At the receiving end, these particular code words must be recognizable with the greatest possible certainty. This is made difficult due to noise which is superposed on the signals as well as superposed interference signals, mainly when transmission takes place in multiple phase modulation. With two-phase, or quadrature, modulation the identification of particular code words is more dependable.

In the system described by A. Ogawa and M. Ohkawa under the title "A New Eight-Phase Modem System for TDMA" as contribution D4 to the conference report of the Second International Conference on Digital Satellite Communication, Paris, France, November, 1972, these particular code words are transmitted in two-phase modulation. A special two-phase demodulator, which has its input connected in parallel with the input of the multiple-phase demodulator, is provided to receive these particular code words. While this arrangement seems to be unacceptably expensive, the fabrication expense for the transmitting end, however, is relatively low. One reason for this is that, with a suitable selected code word, a multi-phase modulator will furnish two-phase signals.

Codeword receivers are customary and there are known embodiments which, for every type of modulation, can indicate reception of a particular code word even if the bits in only a given high proportion of the known number of bit positions of the code word have been determined to be correct. This is called "soft" code word correlation in contrast to "hard" code word correlation in which all bit positions of the particular code word must be received correctly.

In order to solve a different problem, a "soft" evaluation of the individual binary signals has also been proposed in which the evaluator emits not only "O" and "L" (L representing binary one) signals or "−1" and "+1" signals, respectively, but also intermediate value signals in a range around the zero point. Another term for this mode of operation is "half-analog".

SUMMARY OF THE INVENTION

It is an object of the present invention to make possible, in a simple manner, the determination from the four-phase signals of the code words contained therein, which are transmitted as two-phase signals.

These and other objects according to the invention are achieved by a method for detecting a predetermined code word contained in received signals in a transmission system which operates with a four-phase type of modulation at the transmitter and coherent demodulation at the receiver and in which successive signal increments are transmitted and received during successive clock periods, the code word being transmitted only as signals in two phases which are 180° apart and the received signals being divided into orthogonal voltage components during demodulation, which method includes selecting that one of the sum and difference of the voltage components which has the larger absolute magnitude value, and evaluating the received signal in accordance with the algebraic sign of that one of the sum and difference which is thus selected.

According to one embodiment of the invention, the algebraic signs of the orthogonal voltage components of the signal increment received during each clock period are used in order to provide an indication when such signs are opposite during a plurality of clock periods, the sign of one signal component is inverted only upon the occurrence of such indication, the voltage components are summed, with the one component having its sign inverted only when such indication is produced, and the algebraic sign of the resulting sum is employed in evaluating a received signal increment.

According to a second embodiment of the invention, there is formed a representation of the algebraic sum and a representation of the algebraic difference of the orthogonal components of a received signal increment, during a plurality of clock periods a determination is made of which of the sum and difference has the larger absolute value, and a received signal increment is evaluated in accordance with the algebraic sign of that one of the sum and difference which has such larger absolute value.

According to a third embodiment of the invention, there is formed a representation of the algebraic sum and a representation of the algebraic difference of the orthogonal voltage components of a received signal increment, the algebraic signs of the components during a plurality of clock periods are used to produce a first state indication when the components have the same sign and to produce a second state indication when the components have respectively opposite signs, the algebraic sum representation is selected when the first state indication is produced and the algebraic difference representation is selected when the second state indication is produced, and a received signal increment is evaluated in accordance with the algebraic sign of the selected representation.

According to a further feature of the invention, which can be used with each one of the three methods, the probability of dependable detection of the particular code words in the received signals can be increased even in the presence of a greater noise component.

With four-phase modulation, the bits at two bit positions of the binary sequence to be transmitted are combined into a dibit. Since there are four possible combinations, OO, OL, LO and LL of two successive bits, four dibits are possible which are distinguished during transmission by one of the four possible phase positions of a carrier. The individual phase positions have different phase angles which are each equal to an odd number multiple of 45° with respect to the phase of a reference carrier. Usually, the phase positions of the dibits of combinations OO and LL and of combinations OL and LO differ by an angle of 180°, i.e. are in phase opposition to one another.

It is assumed that the period of a bit of a particular code word is twice as long as the period of a bit of a useful information sequence. For the four-phase modulator at the transmitting end, a period of twice the length is equivalent to two periods of the useful information or two half-periods with respect to the signal of the particular code word. When two half-periods of the code word in which the same binary value is present are combined into a dibit, only combinations OO and LL are possible and thus only two different dibits which furnish two-phase signals.

In the known four-phase demodulation processes, the values obtained to fix the phase position of the coordinates are initially scanned in succession by a sequence of clock pulses for each one of the four phase quadrants. It is easy to derive a clock sequence from the received signals with which, of the four quadrants, only two oppositely disposed quadrants will be scanned, but no process is known which forces this clock sequence into that one of the two possible phase positions in which the two-phase signals are being received.

With the above-described methods according to the invention, the two-phase signals of the particular code word are derived from the coordinate values obtained by four-phase demodulation. This is done, according to the first described embodiment of the invention, by causing the signal values from the quadrants not of interest, which in the ideal case are free from noise, to cancel one another out, and in the normal case to furnish a value near zero, and causing the values from the quadrants of interest to furnish a new, greater value.

According to the second described embodiment of the invention, the coordinate values from one of two possible pairs of two oppositely disposed quadrants will furnish different, new, and greater values while the second pair furnishes values near zero. The decision will then be made in dependence on the polarity relationships of the coordinate values in which way the greater values are to be obtained or whether the greater value obtained in the one way or in the other way is to be processed further.

According to the third-described method, new and higher values can be obtained in different ways from the coordinate values of one to two possible values from two oppositely disposed quadrants, while the second pair furnishes values near zero. The decisive factor whether the value obtained in the one way or the one obtained in the other way is processed further is the absolute magnitude of the obtained value. That value which has the greater absolute magnitude is processed further.

DESCRIPTION OF THE PREFERRED EMBODIMENTS

Figure 1:
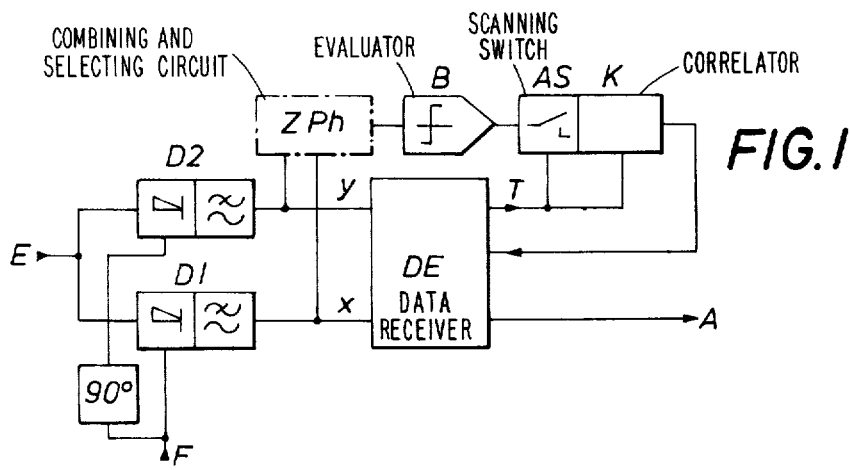
FIG. 1 is a block diagram of a circuit which can be employed for practicing the present invention.
Figure 2:
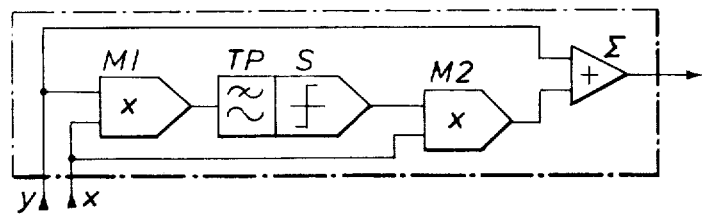
FIGS. 2, 3 and 4 are block circuit diagrams of embodiments of devices which can be used in the circuit of FIG. 1 for carrying out respective procedures according to the invention.
Figure 3:
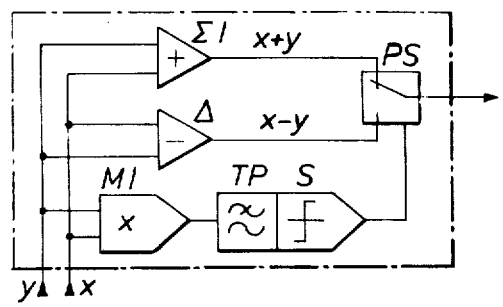
Figure 4:
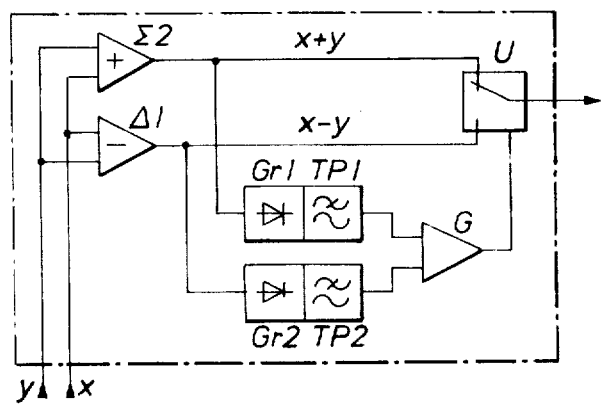

FIG. 1 shows the basic components of the receiving portion of a conventional four-phase system and additionally, in the dash-dot box ZPh, the location for the insertion of the components required to practice the invention in order to obtain two-phase signals, and FIGS. 2, 3 and 4 illustrate three exemplary embodiments of circuit ZPh.

Four-phase modulated signals arriving via input E in the arrangement of FIG. 1 are demodulated in demodulators D1 and D2, which are controlled, respectively, by the reference carrier frequency signal F and that signal phase shifted by 90°, and thus produce representations of the component values along the orthogonal coordinates $x$ and $y$. The subsequently provided data receiver DE obtained from $x$ and $y$ values the original useful information, emits it via output A and also furnishes a clock pulse T. FIG. 1 further shows the known components including an evaluator B, scanning switch AS and correlator K.

The $x$ and $y$ components of the demodulated signals are also supplied to a circuit ZPh operating according to the invention and one embodiment of which is shown in FIG. 2. In this arrangement the $x$ and $y$ values are multiplied together in a first multiplier M1, which, if $x$ and $y$ have the same sign, emits a positive output signal and if $x$ and $y$ have opposite signs it emits a negative output signal. A series connected lowpass filter TP designed to simultaneously act as an integrator which, if the sign relationships remain the same for a plurality of clock periods, furnishes, for example, a direct voltage signal to a sign, or polarity, indicating element, also known as a signum element, S which, when the signs are identical and thus the input voltage is positive, furnishes a "+1" signal to a second multiplier M2 and if the signs are opposite, and thus the input voltage is negative, it furnishes a "−1" signal to the second multiplier M2.

The second input of the second multiplier M2 also receives a first one of the two coordinate values, in the illustrated example the $x$ value, which is now multiplied by +1 if $x$ and $y$ have the same sign, i.e. remains unchanged, or by −1 if $x$ and $y$ have opposite signs, i.e. at the output of M2 the sign of the $x$ component is changed.

The output signal from the second multiplier M2 and the second one of the two coordinate values, in the illustrated example the $y$ value, are red to a summing member $\Sigma$ which furnishes output signals of a higher value if coordinate values $x$ and $y$ have the same sign for phase signals in the first and third quadrants, and if the coordinate values have opposite signs for phase signals in the second and fourth quadrants.

The summing member $\Sigma$ thus furnishes two-phase signals which have the advantage that their signal-to-noise ratio is theoretically 3 dB greater than for the signals obtained according to conventional four-phase demodulation. The particular code word to be detected can thus be recognized with greater certainty in received signals which are full of noise.

FIG. 3 shows another circuit for carrying out the invention which includes a multiplier M1, a lowpass filter TP and a sign indicating element S, which correspond to the same components of FIG. 2 in purpose and operation. Element S furnishes a "+" signal if the $x$ and $y$ components have the same sign and a "−1" signal if the signs are opposite. The arrangement further includes a summing member $\Sigma 1$ and a difference circuit $\Delta$, whose inputs receive the $x$ and $y$ values and whose outputs provide $x+y$ sum values or $x-y$ difference values, respectively.

The polarity of the output signal of element S can determine whether the values $x$ and $y$ are fed to the inputs of summing member $\Sigma 1$ or difference circuit $\Delta$, or whether the summing member or the difference circuit are to be enabled, or whether, as is the case for the embodiment of FIG. 3, the output of the summing member or that of the difference circuit is connected to the subsequent evaluation arrangement. The output signals from element S control a polarized electronic switch PS for this purpose so that the arrangement will furnish the sum of the coordinate values if they both have the same sign and the difference of the coordinate values if the signs are opposite.

The arrangement shown in FIG. 3, as well as that of FIG. 2, furnishes higher amplitude output signals if coordinate values $x$ and $y$ have the same sign only for phase signals in the first and third quadrants and if the coordinate values have opposite signs only for phase signals in the second and fourth quadrants. Phase signals from other pairs of quadrants will not be considered.

In the embodiment of circuit ZPh shown in FIG. 4, a summing member $\Sigma 2$ furnishes, in the same manner as in the arangement of FIG. 3, the sum values $x+y$ from the input signals $x$ and $y$, while the difference values $x-y$ are obtained from the input values $x$ and $y$ by a difference circuit $\Delta 1$. The coordinate values from the first and third quadrants furnish sum values with greater absolute values and the coordinate values from the second and fourth quadrants furnish difference values with greater absolute values. The deciding factor whether the sum or the difference values are to be subsequently evaluated is the greater absolute value.

For this purpose, for example, the sum and difference values $x+y$ and $x-y$ are rectified in recitfiers Gr1 and Gr2, respectively. Lowpass filters TP1 and TP2, respectively, which are each connected in series with a respective one of the rectifiers, simultaneously act as integrators which, if the polarities of the values furnished by the rectifiers remain the same over several clock pulse periods, furnish direct voltage signals, for example, which are fed to a subsequent circuit G which indicates the existing component relationship. Circuit G may be, for example, a differential amplifier with high gain which, if a larger signal is present at a certain first one of its inputs, furnishes a high amplitude or positive signal and, if a larger signal is present at its second input, furnishes an output signal which is near the value zero or is negative. The output signal from circuit G may control an electronic switch U to connect the output of the arrangement with the output of that one of summing member $\Sigma 2$ and the difference circuit $\Delta 1$ which furnishes the higher output.

The further processing of output signals provided by one of the arrangements of FIGS. 2, 3 or 4 may be effected in different ways. In FIG. 1, this output signal is first fed to an evaluator B whose output signal is fed to correlator K via a scanning switch AS which is controlled by clock pulses T.

Determination for the type of further processing is the type of evaluator employed. This may be a known signum, or sign identifying, element or, in modification of the above-described process for even more dependably detecting a particular code word, it may operate in a half-analog manner. Half-analog operating evaluators are understood to include those which operate in an analog manner and linearly around the zero point and which are also known as limiters, and those which have a stepped characteristic around the zero point, which quantize small analog values and emit binary numbers to identify the respective quantizing stage and which are known as analog-digital converters.

Signum elements and limiters differ in their effect only by the slope of their characteristic around the zero point. This slope is essentially infinite for the signum element as shown in the characteristic FIG. 5 and generally finite for the limiter the characteristic of which is shown in FIG. 6 (see DIN 40700, sheet 18, Nos. 23 and 24). In the borderline case of infinite slope, the limiter becomes a signum element.

Figure 5:
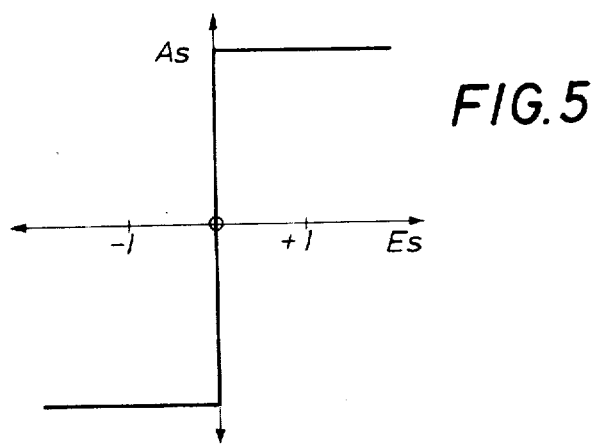
FIGS. 5, 6 and 7 are characteristic curves of different evaluting circuits which may be used in connection with the invention.
Figure 6:
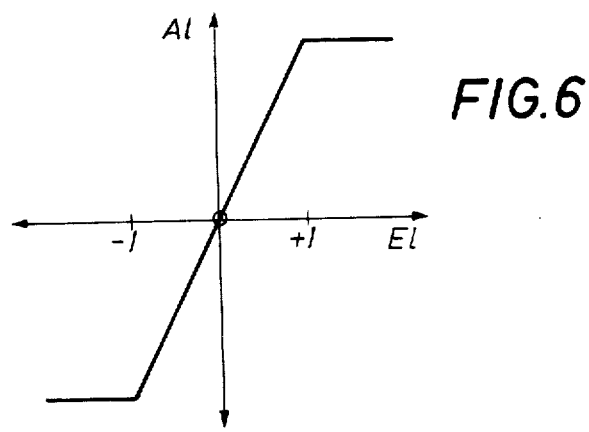

As can be seen from the characteristic FIG. 5 a signum element will deliver an unitary output value As with any input value Es and distinguishes only the polarities, i.e. it operates purely digitally and gives a hard evaluation to the individual binary signals. The subsequent correlator must then also operate binarily. The correlator can, however, also be designed to emit an output signal if it determines coincidence with the particular code word in the received signals at a given minimum number of binary bit locations. If this given minimum number is equal to the number of bits in the code word, it must be received correctly.

If the given minimum number is less than the number of bits of the code word, reception of the particular code word is assumed even if individual binary bits have been received in a mutilated fashion as a result of interference. This is the case of the above-mentioned soft code word correlation.

Figure 8:
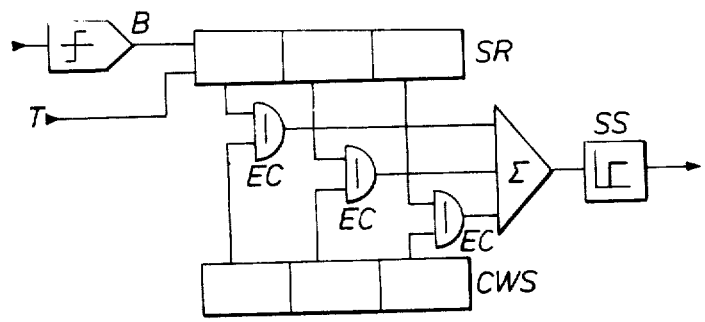
FIGS. 8, 9 and 10 are exemplary block circuit diagrams of different correlating arrangements each of them suited to work with a distinct one of the different evaluators and applicable in connection with the invention.

A simplified block diagram of a correlator K suited to work in connection with a signum element serving as an evaluator B is shown in FIG. 8.

Figure 9:
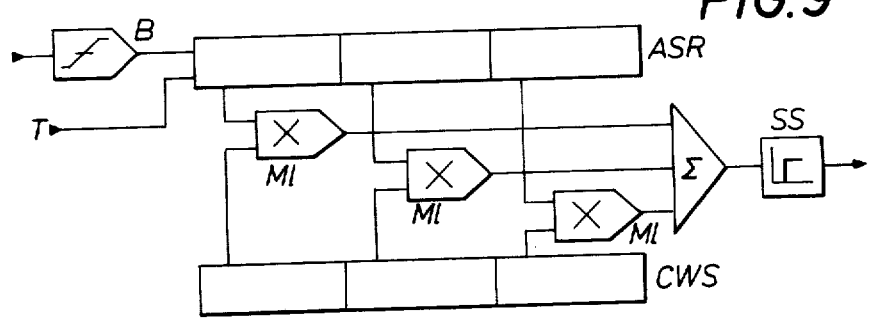
Figure 10:
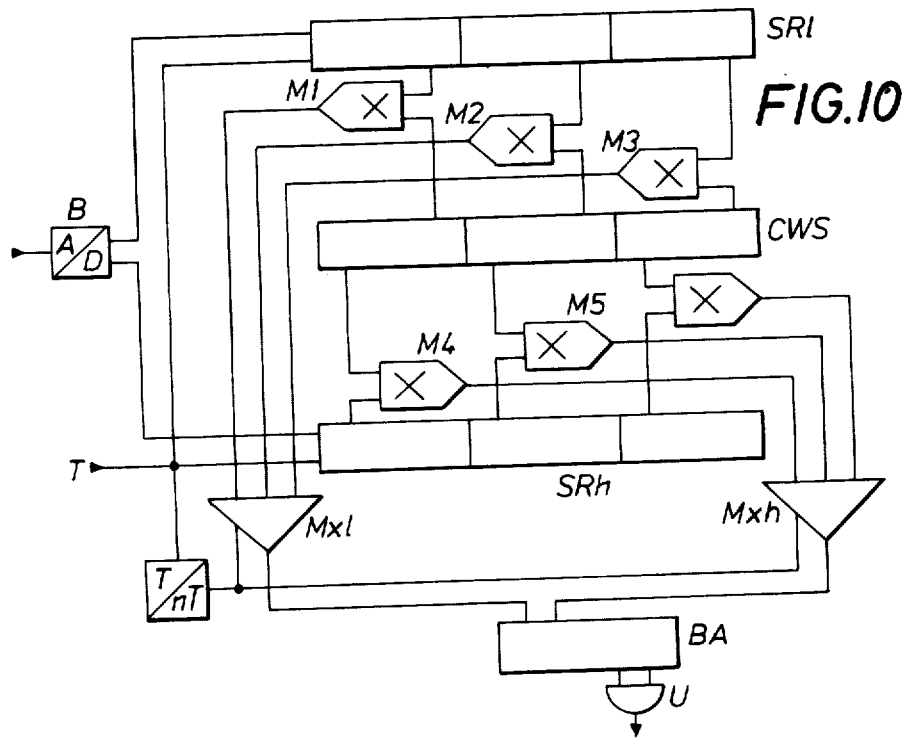

The simplification in the diagram as in the diagrams of FIGS. 9 and 10, too, is that only a three-bit particular code word is assumed, whilst in generally the particular code word consists of 20 or more bits for example. The sampling switch AS shown in FIGS. 1 can be omitted, as its task in all the examples is fulfilled by the used clock controlled shift register.

The lineary output of the signum element are fed in the clock T controlled binary shift register SR. The known particular code word is stored in the code word store CWS, e.g. a read only memory. The contents of the individual stages with the same order number of the shift register and the code word store are compared by equivalence circuits EC, which deliver a binary output signal if the contents of the supervised stages have the same value. The output signals of all equivalence circuits are added by a summing element $\Sigma$. If the sum exceeds a given value the subsequent threshold switch SS will deliver an output signal. The adjustable threshold is decisive for a hard or a soft correlation of the complete particular code word.

The half-analogously operating evaluators also permit soft evaluation of the individual binary signals.

A limiter with a characteristic as per FIG. 6 will deliver unitary output values A1 if the input values E1 are equal or higher than a given value, +1 or −1 in the figure, but proportinal output values if the input values are below the given value. The limiter which serves as evaluator B is advisably dimensioned or controlled so that it furnishes the values +1 or −1, respectively, if signals are received without interference. It can also furnish values between −1 and −1 if the signals contain noise.

The block diagram of a correlator which is suited to operate in connection with a limiter serving as an evaluator B, shown in FIG. 9 is very similar to that of FIG. 8. Instead of a binary shift register an analog shift register ASR is used, and the equivalence circuits are replaced by multipliers M1. The values furnished by the limiter are written into the analog shift register in the correlator and each one of the values is multiplied with the bipolar values of the particular code word stored in the code word stock, again resulting in analog values between −1 and +1.

Figure 7:
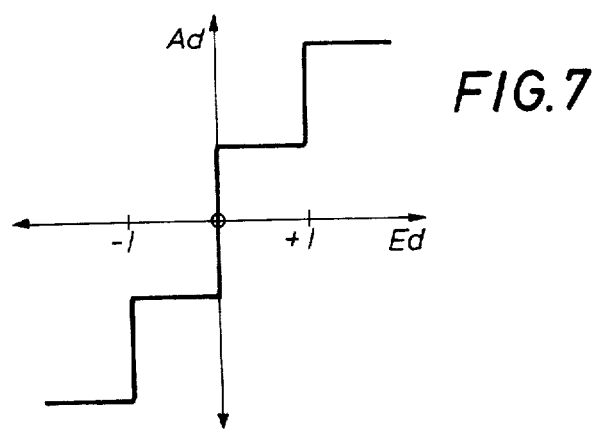

If an analong-digital converter is used as the evaluator, a few quantizing stages are sufficient. An exemplary characteristic curve of such an evaluator is shown in FIG. 7. It will furnish in parallel the individual values of two (as shown) or three positions of a binary number, which corresponds with a quantisised step of its input value.

A block diagram of an exemplary correlator suited to work in connection with an analog-digital converter as an evaluator is shown in FIG. 10.

The correlator comprises a code word stock CWS and a number of clock controlled binary shift registers SR1, SRh equalling the number of outputs of the analog-digital converter B. The signals of each individual output of the converter are written in a separate shift register. The values in the individual stages of the shift registers are then multiplied by multipliers M1 . . . M3 and M4 . . . M6 with the bipolar values of the bit places with the same order number of the particular code word. Furthermore are provided as many multiplexers Mx1, Mxh as shift registers. During one clock period each multiplexer samples the output signals of all multipliers coordinated to one of the shift registers and delivers the sampled signals to one distinct input of a binary adder BA. The two or three different inputs correspond to different position values of a binary number. The multiplexers are controlled by a clock sequence with a clock frequency, which is n times higher than that of the clock T, wherein n is equal to the number of bits in the particular code word. The summing capacity of the binary adder BA is also equal n. Selected higher stages of the binary adder may be supervised by a logic circuit, e.g. and AND-gate, which delivers an output signal if the adder has reached a given position.

In the given examples of correlator exceeding or not exceeding a given sum value may then be decisive for a sufficiently great probability of reception of a particular code word.

The signal emitted by correlator K when a particular code word is received, which can be considered with sufficient probability to be the correct code word, is fed, for example, to data receiver DE as a start signal.

In summary and to provide a comparison with the prior art, it can be stated that the evaluation of the sum obtained by the above-described methods by means of a signum element permits any desired hard or soft code word correlation. The half-analog evaluation of the sum with soft evaluation of the individual binary signals in conjunction with the desired hard or soft code word correlation results in the highest degree of certainty for recognition of the particular code word in received signals containing greater noise components.

It will be understood that the above description of the present invention is susceptible to various modifications, changes and adapations and the same are intended to be comprehended within the meaning and range of equivalents of the appended claims.

What is claimed is:

1. A method for detecting a predetermined code word contained in received signals in a transmission system which operates with four-phase or four-phase difference modulation at the transmitter and coherent demodulation at the receiver and in which successive signal increments are transmitted and received during successive clock periods, the code word being transmitted only as signals in two phases which are 180° apart and the received signals being divided into orthogonal voltage components during demodulation, said method comprising: monitoring the algebraic signs of the orthogonal voltage components of the signal increment received during each clock period and providing an indication when such signs are opposite during each one of a successive plurality of clock periods; processing one voltage component of a signal increment in a manner to invert its sign only upon occurrence of such indication; algebraically summing the processed one voltage component with the other voltage component of the same signal increment; and evaluating a received signal increment in accordance with the algebraic sign of the voltage produced in said summing step.

2. A method as defined in claim 1 wherein said step of evaluating comprises providing a signal indicating the algebraic sign of the voltage produced in said summing step by means of an evaluator which operates in a binary manner, providing the predetermined codeword and correlating, in a correlator connected in series with the evaluator and operating in a binary manner, the algebraic sign indicating signal to furnish an output signal upon occurrence of coincidence of a given minimum number of signal increments with the predetermined code word.

3. A method as defined in claim 1 wherein said step of evaluating comprises providing a signal indicating the algebraic sign of the voltage produced in said summing step by means of an evaluator which operates in an analog manner over a selected range around the zero amplitude signal level, storing the signals provided by the evaluator in individual stages of an analog shift register in a correlator connected in series with the evaluator, providing the predetermined codeword and effecting analog multiplication, in the correlator, of the stored signals with the individual binary values of the predetermined code word.

4. A method as defined in claim 3 wherein said step of evaluating further comprises adding together the products of the multiplication performed in the correlator and emitting an output signal from the correlator when the adding step produces a given minimum value.

5. A method as defined in claim 1 wherein said step of evaluating comprises providing a signal indicating the algebraic sign of the voltage produced in said summing step by means of an evaluator which prevents a stepped response in a selected range around the zero amplitude signal level and which quantizes the voltage applied to it to produce a binary value, supplying such binary values to a correlator connected in series with the evaluator, and effecting multiplication, in the correlator, of the binary values with the individual binary values of the predetermined code word.

6. A method as defined in claim 5 wherein said step of evaluating further comprises adding together the products of the multiplication performed in the correlator and emitting an output signal from the correlator when the adding step produces a given minimum value.

7. A method for detecting a predetermined code word contained in received signals in a transmission system which operates with four-phase or four-phase difference modulation at the transmitter and coherent demodulation at the receiver and in which successive signal increments are transmitted and received during successive clock periods, the code word being transmitted only as signals in two phases which are 180° apart, and the received signals being divided into orthogonal voltage components during demodulation, said method comprising: forming a representation of the algebraic sum and a representation of the algebraic difference of the orthogonal voltage components of a received signal increment; determining which of the sum and difference has the larger absolute magnitude value; and evaluating a received signal increment in accordance with the algebraic sign of that one of the sum and difference which has such larger absolute value.

8. A method as defined in claim 7 wherein said step of evaluating comprises providing a signal indicating the algebraic sign of that one of the sum and difference which has such larger absolute value by means of an evaluator which operates in a binary manner, providing the predetermined codeword and correlating, in a correlator connected in series with the evaluator and operating in a binary manner, the algebraic sign indicating signal to furnish an output signal upon occurrence of coincidence of a given minimum number of signal increments with the predetermined code word.

9. A method as defined in claim 7 wherein said step of evaluating comprises providing a signal indicating the algebraic sign of that one of the sum and difference which has such larger absolute value by means of an evaluator which operates in an analog manner over a selected range around the zero amplitude signal level, storing the signals provided by the evaluator in individual stages of an analog shift register in a correlator connected in series with the evaluator, providing the predetermined code word and effecting analog multiplication, in the correlator, of the stored signals with the individual binary values of the predetermined code word.

10. A method as defined in claim 9 wherein said step of evaluating further comprises adding together the products of the multiplication performed in the correlator and emitting an output signal from the correlator when the adding step produces a given minimum value.

11. A method as defined in claim 7 wherein said step of evaluating comprises providing a signal indicating the algebraic sign of that one of the sum and difference which has such larger absolute value by means of an evaluator which presents a stepped response in a selected range around the zero amplitude signal level and which quantizes the voltage applied to it to produce a binary value, supplying such binary values to a correlator connected in series with the evaluator, and effecting multiplication, in the correlator, of the binary values with the individual biary values of the predetermined code word.

12. A method as defined in claim 11 wherein said step of evaluating further comprises adding together the products of the multiplication performed in the correlation and emitting an output signal from the correlator when the adding step produces a given minimum value.

13. A method for detecting a predetermined code word contained in received signals in a transmission system which operates with four-phase or four-phase difference modulation at the transmitter and coherent demodulation at the receiver and in which successive signal increments are transmitted and received during successive clock periods, the code word being transmitted only as signals in two phases which are 180° apart, and the received signals being divided into orthogonal voltage components during demodulation, the improvement comprising: forming a representation of the algebraic sum and a representation of the algebraic difference of the orthogonal voltage components of a received signal increment, monitoring the algebraic signs of these components and producing a first state indication when the components have the same sign and producing a second state indication when the components have respectively opposite signs; selecting the algebraic sum representation when the first state indication is produced and selecting the algebraic difference representation when the second state indication is produced; and evaluating a received signal increment in accordance with the algebraic sign of the selected representation.

14. A method as defined in claim 13 wherein said step of evaluating comrprises providing a signal indicating the algebraic sign of the representation by means of an evaluator which operates in a binary manner, and correlating, in a correlator connected in series with the evaluator providing the predetermined code word and operating in a binary manner, the algebraic sign indicating signal to furnish an output signal upon occurrence of coincidence of a given minimum number of signal increments with the predetermined code word.

15. A method as defined in claim 13 wherein said step of evaluating comprises providing a signal indicating the algebraic sign of the selected representation by means of an evaluator which operates in an analog manner over a selected range around the zero amplitude signal level, storing the signals provided by the evaluator in individual stages of an analog shift register in a correlator connected in series with the evaluator, providing the predetermined code word and effecting analog multiplication, in the correlator, of the stored signals with the individual binary values of the predetermined code word.

16. A method as defined in claim 15 wherein said step of evaluating further comprises adding together the products of the multiplication performed in the correlator and emitting an output signal from the correlator when the adding step produces a given minimum value.

17. A method as defined in claim 13 wherein said step of evaluating comprises providing a signal indicating the algebraic sign of the selected representation by means of an evaluator which presents a stepped response in a selected range around the zero amplitude signal level and which quantizes the voltage applied to it to produce a binary value, supplying such binary values to a correlator connected in series with the evaluator, and effecting multiplication, in the correlator, of the binary values with the individual binary values of the predetermined code word.

18. A method as defined in claim 17 wherein said step of evaluating further comprises adding together the products of the multiplication performed in the correlator and emitting an output signal from the correlator when the adding step produces a given minimum value.

* * * * *